(12) United States Patent
Lee et al.

(10) Patent No.: US 7,944,810 B2
(45) Date of Patent: May 17, 2011

(54) RECEIVING APPARATUS AND METHOD FOR SINGLE CARRIER FREQUENCY DIVISION ACCESS SYSTEM

(75) Inventors: Joo-Hyun Lee, Suwon-si (KR); Soong-Yoon Choi, Suwon-si (KR); Sang-Boh Yun, Seongnam-si (KR); Sung-Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 12/336,936

(22) Filed: Dec. 17, 2008

(65) Prior Publication Data
US 2009/0154335 A1   Jun. 18, 2009

(30) Foreign Application Priority Data
Dec. 17, 2007   (KR) .................. 10-2007-0132046

(51) Int. Cl.
*H04J 11/00*   (2006.01)

(52) U.S. Cl. ...................................................... 370/208

(58) Field of Classification Search .................. 370/203, 370/208, 206, 207, 210, 310, 315, 316, 319, 370/328, 329, 331, 332, 334
See application file for complete search history.

(56) References Cited

U.S. PATENT DOCUMENTS

| | | | |
|---|---|---|---|
| 2007/0189151 A1* | 8/2007 | Pan et al. ...................... | 370/210 |
| 2007/0195865 A1* | 8/2007 | Joetten et al. ................. | 375/148 |
| 2008/0037670 A1* | 2/2008 | Lee et al. ...................... | 375/260 |
| 2008/0279298 A1* | 11/2008 | Ben-Yishai et al. .......... | 375/261 |

* cited by examiner

*Primary Examiner* — Kwang B Yao
*Assistant Examiner* — Obaidul Huq
(74) *Attorney, Agent, or Firm* — Jefferson IP Law, LLP

(57) ABSTRACT

A receiver and a receiving method for a Single Carrier Frequency Division Multiple Access (SC-FDMA) system are provided. The receiver includes a matrix selector for selecting a constant channel matrix according to a Multiple-Input Multiple-Output (MIMO) reception scheme, a channel equalizer for equalizing a multi-path channel to a specific path channel in a frequency domain by using the constant channel matrix, and a MIMO detector for detecting a Euclidean distance of transmittable symbols from a time-domain Transmit (Tx) signal by using the channel equalized in the frequency domain and then for selecting a symbol having a minimum distance.

18 Claims, 4 Drawing Sheets

RECEIVING APPARATUS AND METHOD FOR SINGLE CARRIER FREQUENCY DIVISION ACCESS SYSTEM

PRIORITY

This application claims the benefit under 35 U.S.C. §119(a) of a Korean patent application filed in the Korean Intellectual Property Office on Dec. 17, 2007 and assigned Serial No. 10-2007-0132046, the entire disclosure of which is hereby incorporated by reference.

BACKGROUND OF THE INVENTION

1. Field of the Invention

The present invention relates to a receiving apparatus and method for a Single Carrier-Frequency Division Multiple Access (SC-FDMA) system. More particularly, the present invention relates to a receiving apparatus and method for an SC-FDMA system, whereby a multi-path channel is converted into a single path channel, channel compensation is performed in a frequency domain, and a received symbol is processed in a time domain.

2. Description of the Related Art

A technique for reducing a Peak-to-Average Power Ratio (PAPR) and ensuring orthogonality between users has recently emerged as an important issue for improving performance in uplink communication. An Orthogonal Frequency Division Multiple Access (OFDMA) scheme is widely used but has a demerit in that the PAPR is high. In general, the PAPR is problematic when one user uses multiple carriers or multiple codes as in the case of Code Division Multiple Access (CDMA) scheme. Therefore, in terms of PAPR performance, a method of using a single carrier is preferred. A Single Carrier-Frequency Division Multiple Access (SC-FDMA) scheme is a prominent single carrier scheme discussed in the 3rd Generation Partnership Project (3GPP).

FIG. 1A illustrates a Multiple Input Multiple Output (MIMO) receiver in a conventional SC-FDMA system.

The receiver of FIG. 1A includes an N-Fast Fourier Transform (FFT) processor 100, a channel estimator 102, a linear MIMO detector 104, a plurality of Inverse Discrete Fourier Transform (IDFT) units 106-1 to 106-L, and a Forward Error Correction (FEC) decoder 108.

The N-FFT processor 100 converts a Radio Frequency (RF) signal received through at least one Receive (Rx) antenna into a baseband signal and converts the baseband signal into a frequency-domain signal by performing an FFT operation.

The channel estimator 102 de-maps respective data symbol signals from subcarriers, wherein the data symbol signals are converted into frequency-domain signals by the FFT unit 100 and estimates respective channels by using pilot signals from among the output signals.

The linear MIMO detector 104 compensates for the data symbol signals de-mapped from the subcarriers in a frequency domain by using respective channel estimation values estimated by the channel estimator 102. Then, the linear MIMO detector 104 divides the resultant signals into L MIMO layers (e.g., corresponding to the number of flows transmitted from a transmitter) and outputs the signals to the respective IDFT units 106-1 to 106-L. An IDFT size of the IDFT unit 106 varies according to an amount of a resource allocated to each user. The linear MIMO detector 104 may use a Minimum Mean Squared Error (MMSE) scheme.

The IDFT units 106-1 to 106-L perform an IDFT operation on signals which are output for respective layers separated by the linear MIMO detector 104, and generate soft-out values for decoding.

The FEC decoder 108 decodes the soft-out values received from the IDFT units 106-1 to 106-L and performs error correction on decoded information bits.

As described above, when MIMO detection is performed, the linear MIMO receiver can separate the MIMO layers and can generate the soft-out value for decoding by using only a MIMO channel matrix irrespective of a Transmit (Tx) symbol vector. Therefore, in a manner similar to the OFDMA system, the SC-FDMA system also compensates for a channel for each subcarrier in the frequency domain and separates the MIMO layers, and thereafter generates the soft-out values by performing an IDFT operation. However, when the linear MIMO receiver is used in the SC-FDMA system, unlike in the OFDMA system, a Tx signal vector of the frequency domain is first separated and is then subjected to the IDFT operation to generate soft-out values for a Tx symbol vector of a time domain.

Meanwhile, the performance of the linear MIMO receiver is basically inferior to that of a non-linear MIMO receiver. To overcome this problem, a Maximum-Likelihood (ML)-based non-linear MIMO receiver providing excellent performance can be considered for use in the SC-FDMA system.

FIG. 1B illustrates a conventional ML-based nonlinear MIMO receiver.

The receiver of FIG. 1B includes an N-FFT processor 101, a channel estimator 102, a plurality of IDFT units 103-1 to 103-$N_R$, an ML MIMO detector 105, and an FEC decoder 107. The N-FFT processor 101, the channel estimator 102, and the FEC decoder 107 are the same as the N-FFT processor 100, the channel estimator 102, and the FEC decoder 108 described in FIG. 1A, and thus detailed explanations thereof will be omitted.

The N-FFT processor 101 converts an RF signal received through at least one Rx antenna into a baseband signal and converts the baseband signal into a frequency-domain signal by performing an FFT operation.

The IDFT units 103-1 to 103-$N_R$ perform an IDFT operation on signals which have undergone the FFT operation and thus convert the signals into time-domain signals. The time-domain signals are output to the ML MIMO detector 105. An IDFT size (i.e., $N_{IDFT}$) of the IDFT unit 103 varies according to an amount of a resource allocated to each user.

The channel estimator 102 de-maps respective data symbol signals from subcarriers, wherein the data symbol signals are converted into frequency-domain signals by the FFT unit 101. Then, the channel estimator 102 estimates respective channels by using pilot signals from among the output signals.

Unlike the linear MIMO detector 104 of FIG. 1A, the ML MIMO detector 105 determines an ML criterion by using a candidate Tx symbol vector and a channel matrix estimated by the channel estimator 102. The ML criterion for ML-based MIMO reception in the frequency domain of the SF-FDMA system can be expressed by Equation (1) below.

$$\hat{S}_k = \min_{S_k} \|R_k - H_k S_k\|^2 \qquad [\text{Eqn. 1}]$$

$$= \min_{s_0,\ldots,s_{N_{DFT}-1}} \left\| R_k - H_k \left\{ \sum_{n=0}^{N_{DFT}-1} s_n \exp\left(-j\frac{2\pi n k}{N_{DFT}}\right) \right\} \right\|^2$$

In Equation (1), $R_k$ denotes an Rx signal vector, $H_k$ denotes a channel matrix, $S_k$ denotes a candidate Tx symbol vector in the frequency domain, $N_{DFT}$ denotes a DFT size, $s_n$ denotes a candidate Tx symbol vector in the time domain and k denotes a subcarrier index.

The FEC decoder 107 decodes soft-out values provided from the ML MIMO detector 105 and performs error correction on the decoded information bits.

Referring to Equation (1) above, in the frequency domain of the SC-FDMA system, the ML criterion has to be determined not for a candidate Tx symbol vector but for a DFT-converted candidate Tx signal vector. Therefore, if the number of Tx streams is equal to the number of Tx antennas and if the same modulation scheme is used in which a size of a signal constellation point is $|C|$, a computational amount is increased by $(|C|^{N_T})^{N_{DFT}}$ to obtain a size of a candidate signal vector. In the conventional ML-based MIMO receiver, the candidate signal vector of an OFDMA system has a size of $(|C|^{N_T})$. In comparison thereto, the candidate signal vector of the SC-FDMA system has a size that increases exponentially with $N_{DFT}$ with respect to complexity of the conventional ML-based MIMO receiver. Disadvantageously, the ML-based MIMO receiver cannot be implemented in practice in the frequency domain of the SC-FDMA system.

In contrast, when ML-based MIMO reception is achieved in the time domain, the ML criterion for ML-based MIMO reception can be expressed by Equation (2) below.

$$\hat{s}_n = \min_{s_n | n-d_i^{r,t}} \left\| r_n - \left[ \sum_{t=1}^{N_T} \sum_{i=0}^{P_{1,t}-1} h_i^{1,t} s_{n-d_i^{1,t}} \cdots \sum_{t=1}^{N_T} \sum_{i=0}^{P_{N_R,t}-1} h_i^{N_R,t} s_{n-d_i^{N_R,t}} \right]^T \right\|^2 \quad [\text{Eqn. 2}]$$

In Equation (2), $r_n$ denotes an $n^{th}$ sample Rx signal vector in the time domain, $S_{n-d_i^{r,t}}$ denotes a symbol transmitted through a Tx antenna 't' prior to $d_i^{r,t}$ samples, $P_{r,t}$ denotes the number of resolvable multiple paths between the Tx antenna 't' and an Rx antenna 'r', $h_i^{r,t}$ denotes a channel coefficient of an $i^{th}$ path, $T_s$ denotes a sample period, and $d_i^{r,t}$ denotes a sample unit delay of the $i^{th}$ path.

When the ML-based MIMO reception is achieved in the time domain, a delay profile of a multi-path channel may vary depending on a pair of Tx/Rx antennas. Eventually, a 2-dimensional space-time domain equalizer is necessary to compensate for the multi-path channel. Thus, a size of a candidate symbol vector of a current sample decreases to $|C|^{N_T}$. However, since candidate symbol vectors are required for up to $$N_s = \sum_{r=1}^{N_S} \sum_{t=1}^{N_T} P_{r,t}$$

samples detected previously according to the delay profile of the multi-path channel when the ML criterion is determined, there is a shortcoming in that complexity still increases by $(|C|^{N_T})^{N_S}$. To compensate for such a shortcoming, the ML criterion is determined by limiting the candidate symbol vectors only for W samples existing near the current sample without having to consider all symbols in association with the multi-path delay profile.

In FIG. 1B, the linear MIMO reception scheme is still used to separate signals of multiple users, and the ML reception scheme is additionally considered for the purpose of removing Inter-Symbol Interference (ISI) in the time domain. In this case, a MIMO reception performance may still deteriorate since influence on all multiple paths are not considered. A size of a candidate symbol vector required to determine an ML function is $(|C|^{N_T})^{2W+1}$. Thus, complexity increases exponentially with $2W+1$ with respect to $|C|^{N_T}$.

As described above, when the ML-based MIMO detection is performed in the SC-FDMA system, a candidate Tx symbol vector increases exponentially with a length of IDFT in the frequency domain and a computational amount of an ML criterion increases exponentially with a total sum of multiple paths in the time domain, resulting in difficult implementation.

SUMMARY OF THE INVENTION

An aspect of the present invention is to address at least the above-mentioned problems and/or disadvantages and to provide at least the advantages described below. Accordingly, an aspect of the present invention is to provide a receiving apparatus and method for a Single Carrier-Frequency Division Multiple Access (SC-FDMA) system, whereby a multi-path channel is converted into a single path channel, channel compensation is performed in a frequency domain and a received symbol is processed in a time domain.

In accordance with an aspect of the present invention, a receiving apparatus in an SC-FDMA system is provided. The receiving apparatus includes a matrix selector for selecting a constant channel matrix according to a Multiple-Input Multiple-Output (MIMO) reception scheme, a channel equalizer for equalizing a multi-path channel to a specific path channel in a frequency domain by using the constant channel matrix, and a MIMO detector for determining a Euclidean distance of transmittable symbols from a time-domain Transmit (Tx) signal using the channel equalized in the frequency domain and for selecting a symbol having a minimum distance.

In accordance with another aspect of the present invention, a receiving method in an SC-FDMA system is provided. The receiving method includes selecting a constant channel matrix according to a MIMO reception scheme, equalizing a multi-path channel to a specific path channel in a frequency domain by using the constant channel matrix, determining a Euclidean distance of transmittable symbols from a time-domain Tx signal by using the channel equalized in the frequency domain and selecting a symbol having a minimum distance.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1A:
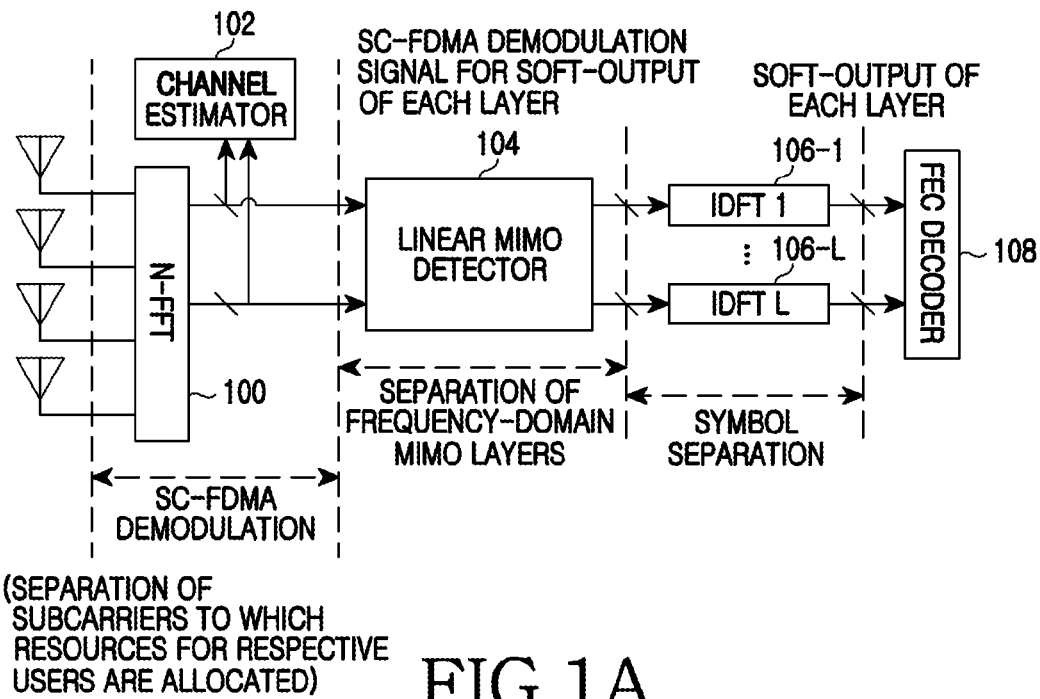
FIG. 1A illustrates a Multi Input Multi Output (MIMO) receiver in a conventional Single Carrier-Frequency Division Multiple Access (SC-FDMA) system.
Figure 1B:
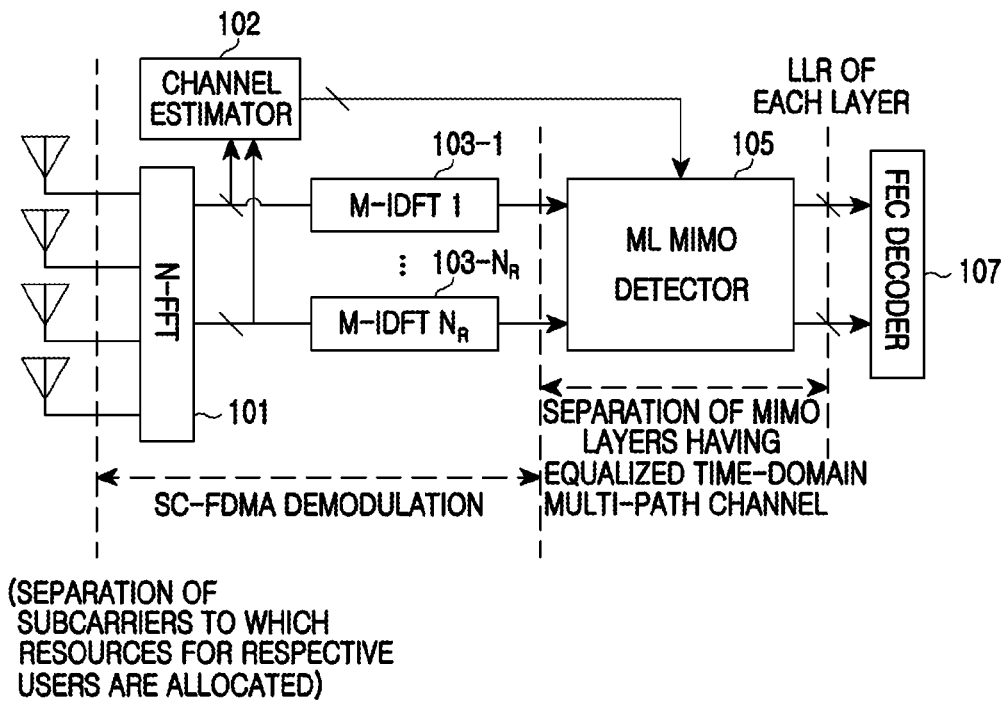
FIG. 1B illustrates a conventional Maximum-Likelihood (ML)-based nonlinear MIMO receiver.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, an exemplary receiving apparatus and method for a Single Carrier Frequency Division Multiple Access (SC-FDMA) communication system are provided in which a multi-path channel is converted into a single path channel, channel compensation is performed in a frequency domain and a received symbol is processed in a time domain.

A Maximum Likelihood (ML)-based Multiple Input Multiple Output (MIMO) receiver operates in the time domain in which both a MIMO channel matrix and a Transmit (Tx) symbol vector can be used. In the time domain, due to a multi-path channel, the number of channel matrixes is not one but is equal to a total number of multiple paths between a Tx antenna and a Receive (Rx) antenna. On the other hand, in the frequency domain, it can be assumed that the number of channel matrixes is one for each subcarrier due to an influence of a multi-path channel. Therefore, channel compensation can be easily performed in the frequency domain. Equation (3) below shows a relationship between an impulse response for the multi-path channel of the time domain and a per-subcarrier selectivity of the frequency domain in an arbitrary Tx/Rx antenna.

$$H_k^{r,t} = \sum_{n=0}^{N_{DFT}-1} h_n^{r,t} \exp\left(-j\frac{2\pi nk}{N_{DFT}}\right),$$ [Eqn. 3]

$$h_n^{r,t} = \frac{1}{N_{IDFT}} \sum_{k=0}^{N_{IDFT}-1} H_k^{r,t} \exp\left(j\frac{2\pi nk}{N_{DFT}}\right)$$

$$\sum_{k=0}^{N_{IDFT}-1} \exp\left(j\frac{2\pi nk}{N_{DFT}}\right) = \begin{cases} 1, & \text{if } n = 0 \\ 0, & \text{otherwise} \end{cases}$$

In Equation (3), r denotes an Rx antenna index, t denotes a Tx antenna index, $H_k^{r,t}$ denotes a channel matrix for a $k^{th}$ subcarrier of the frequency domain between a Tx antenna 't' and an Rx antenna 'r', $h_n^{r,t}$ denotes a channel matrix for an $n^{th}$ symbol of the time domain between the Tx antenna 't' and the Rx antenna 'r', k denotes a subcarrier index, n denotes a data symbol index, $N_{DFT}$ denotes a Discrete Fourier Transform (DFT) size, and $N_{IDFT}$ denotes an Inverse DFT (IDFT) size. The DFT size and the IDFT size are the same with respect to one user, and vary according to an amount of a resource allocated to each user.

If a frequency selectivity for each subcarrier is 0, Equation (4) below can be obtained from Equation (3) above. Equation (4) below shows that the number of multiple paths is one in the time domain.

$$H_0^{r,t} = \ldots = H_{N_{DFT}-1}^{r,t} = H^{r,t} \Longleftrightarrow h_0^{r,t} = H^{r,t}, h_0^{r,t} = \ldots = h_{N_{DFT}-1}^{r,t} = 0$$ [Eqn. 4]

In Equation (4), $H^{r,t}$ denotes a channel constant of the frequency domain, and $h^{r,t}$ denotes a channel constant of the time domain. That is, if all subcarriers having an IDFT size are set to $H^{r,t}$, the channel constant corresponds to a $0^{th}$ symbol in the time domain, and the remaining symbols have a value of zero.

As described above, if the multi-path channel can be converted to be similar to a single path channel in the time domain by removing frequency selectivity, the ML-based MIMO receiver can operate in the time domain in substantially the same manner as in the single path channel. In this case, the frequency selectivity can be removed by properly converting a channel matrix in the frequency domain (see FIGS. 4A and 4B). Accordingly, exemplary embodiments of the present invention propose a method in which a channel matrix of the frequency domain is equalized so that a MIMO channel can be compensated for in the frequency domain and the ML-based MIMO reception can be performed in the time domain.

Figure 2:
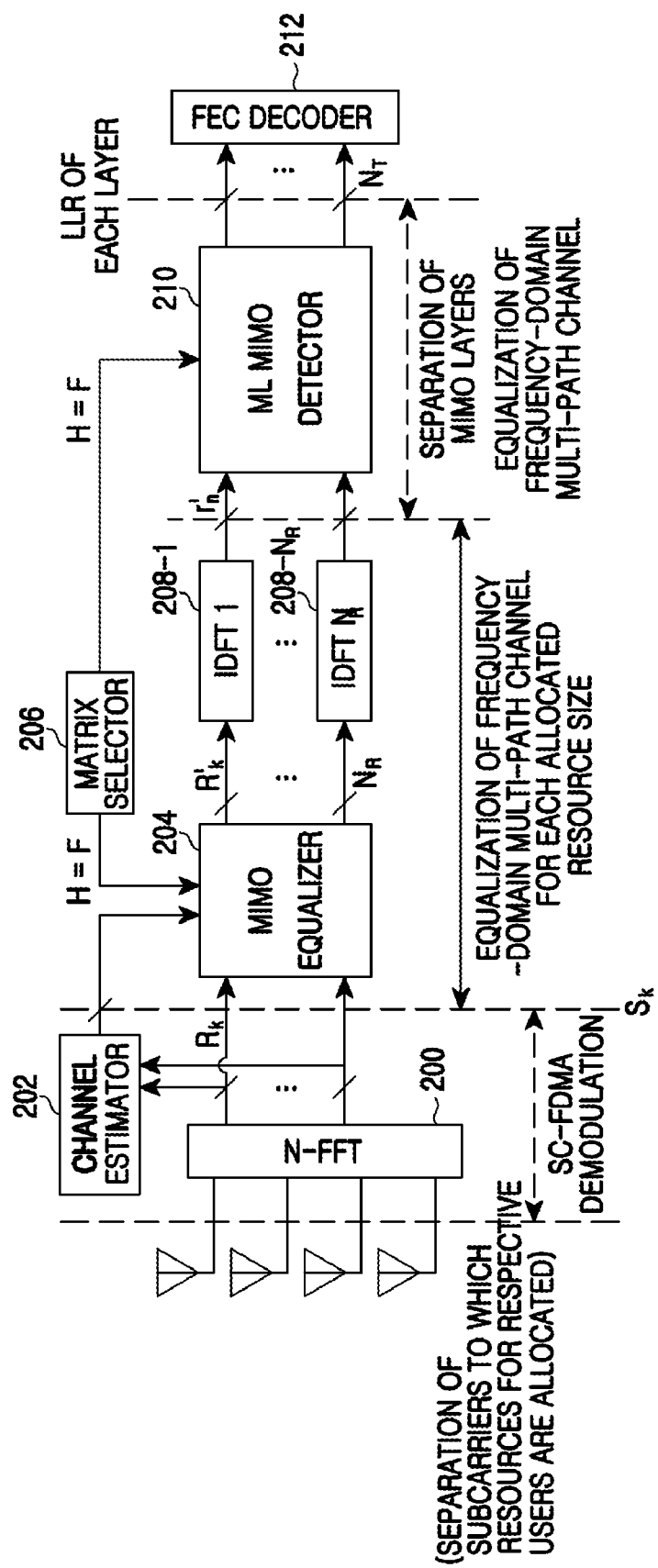
FIG. 2 illustrates a non-linear MIMO receiver in an SC-FDMA system according to an exemplary embodiment of the present invention.

FIG. 2 illustrates a non-linear MIMO receiver in an SC-FDMA system according to an exemplary embodiment of the present invention.

The receiver of FIG. 2 includes an N-Fast Fourier Transform (FFT) processor 200, a channel estimator 202, a MIMO equalizer 204, a matrix selector 206, a plurality of IDFT units 208-1 to 208-$N_R$, an ML MIMO detector 210, and a Forward Error Correction (FEC) decoder 212.

The N-FFT processor 200 converts a Radio Frequency (RF) signal received through at least one Rx antenna into a baseband signal, and divides the RF signal into subcarriers having an IDFT size (i.e., $N_{IDFT}$) by performing an FFT operation. The channel estimator 202 receives $N_{IDFT}$ subcarriers from the N-FFT processor 200 and estimates channels for the subcarriers.

The channel equalizer 204 multiplies a channel equalization channel by an Rx signal vector of the frequency domain by removing or reducing a frequency selectivity so as to convert a multi-path channel in a time domain into a single path channel or a specific multi-path channel whose number of paths is reduced. Thus, the channel equalizer 204 outputs an equalized Rx signal vector of a frequency domain. Herein, a channel equalization matrix $T_k$ of the frequency domain can be determined by receiving a constant channel matrix H from the matrix selector 206. The channel equalization matrix $T_k$ can be determined using Equation (5) below.

$$T_k \hat{H}_k = H, \quad T_k = H \times Inv(\hat{H}_k) \quad [\text{Eqn. 5}]$$

In Equation (5), $\hat{H}_k$ denotes a channel estimation matrix of a $k^{th}$ subcarrier, H denotes a constant channel matrix, and Inv(•) denotes an inverse matrix operation. The constant channel matrix H for channel equalization is defined by Equation (6) below.

$$H = \sum_{q=0}^{Q-1} H_q \exp\left(-j \frac{2\pi \tau_q k}{N}\right) \quad [\text{Eqn. 6}]$$

$$\tau_q \in \{\text{integer} | 0 \leq \tau_q \leq N, \tau_0 = 0\}$$

In Equation (6), Q denotes the number of channel paths, which is decreased after channel equalization, and $\tau_q$ denotes a sample unit delay of a $(q+1)^{th}$ path. That is, if Q=1, then H=$H_0$. In that case, where a channel is equalized to a single path channel. In the case that 1<Q<<N, the channel is equalized to a specific multi-path channel whose number of paths is reduced. In the following description, it is assumed that Q=1.

In particular, $Inv(\hat{H}_k)$ can be variously transformed according to the number of Tx/Rx antennas or an optimization scheme, as expressed by Equation (7) below.

$$Inv(\hat{H}_k) = \quad [\text{Eqn. 7}]$$

$$\begin{cases} (\hat{H}_k)^{-1} & \text{for ML Rx with } N_T = N_R \\ \{(\hat{H}_k)^H \hat{H}_k\}^{-1}(\hat{H}_k)^H & \text{for ML Rx with Moore-Penrose Inverse} \\ \{\hat{H}_k(\hat{H}_k)^H\}^{-1} & \text{for ZF Rx with } H = (\hat{H}_k)^T \\ \{\hat{H}_k(\hat{H}_k)^H + \sigma_n^2 I_{N_R}\}^{-1} & \text{for MMSE Rx with } H = (\hat{H}_k)^T \end{cases}$$

In Equation (7), $\hat{H}_k$ denotes a $k^{th}$ subcarrier channel estimation matrix, $\sigma_n^2$ denotes a dispersion of noise included in a pilot signal used in channel estimation, $I_{N_R}$ denotes a unit matrix, $(\bullet)^{-1}$ denotes an inverse matrix operation, and $(\bullet)^H$ denotes a Hermitian matrix.

That is, in Equation (5) above, if the number of Tx antennas is equal to the number of Rx antennas and if H=$(\hat{H}_k)^T$ in an ML-based receiver, $Inv(\hat{H}_k)$ is $(\hat{H}_k)^{-1}$. When the ML-based receiver uses a Moore-Penrose inverse matrix, $Inv(\hat{H}_k)$ is $\{(\hat{H}_k)^H \hat{H}_k\}^{-1}(\hat{H}_k)^H$. If H=$(\hat{H}_k)^T$ in a Zero Forcing (ZF)-based receiver, $Inv(\hat{H}_k)$ is $\{\hat{H}_k(\hat{H}_k)^H\}^{-1}$. If H=$(\hat{H}_k)^T$ in a Minimum Mean Squared Error (MMSE)-based receiver, $Inv(\hat{H}_k)$ is $\{\hat{H}_k(\hat{H}_k)^H + \sigma_n^2 I_{NR}\}^{-1}$.

If Q=1 in Equation (6) above, a given channel equalization matrix can be multiplied by a frequency-domain Rx signal vector $R_k$ to obtain an equalized frequency-domain Rx signal vector $R'_k$ expressed by Equation (8) below.

$$R'_k = T_k R_k \quad [\text{Eqn. 8}]$$

$$= \{H_0 \times Inv(\hat{H}_k)\}\{H_k S_k + n_k\}$$

$$= H_0\{Inv(\hat{H}_k) H_k\} S_k + T_k n_k$$

In Equation (8), $R'_k$ denotes an Rx signal vector which is channel-equalized in the frequency domain, $T_k$ denotes a channel equalization matrix, $R_k$ denotes an Rx signal vector in the frequency domain, $H_0$ denotes a constant channel in the frequency domain, $\hat{H}_k$ denotes a channel estimation matrix of a $k^{th}$ subcarrier, $H_k$ denotes a channel matrix of the $k^{th}$ subcarrier, $S_k$ denotes a Tx signal vector in the frequency domain, and $n_k$ denotes a noise in the frequency domain.

If the channel matrix of Equation (7) above can be correctly estimated and its inverse matrix exists, it can be assumed that $\{Inv(\hat{H}_k) H_k\} = I_{N_R}$. Thus, Equation (8) can be expressed by Equation (9) below.

$$R'_k = H_0 S_k + n'_k, \quad n'_k = T_k n_k \quad [\text{Eqn. 9}]$$

In Equation (9), $R'_k$ denotes an Rx signal vector which is channel-equalized in the frequency domain, $H_0$ denotes a constant channel in the frequency domain, $S_k$ denotes a Tx signal vector in the frequency domain, $n'_k$ denotes an equalized noise in the frequency domain, $n_k$ denotes a noise in the frequency domain, and $T_k$ denotes a channel equalization matrix. That is, as expressed by Equation (9) above, a channel matrix is converted into the constant matrix $H_0$ for $N_{IDFT}$ subcarriers irrespective of the value k in the Tx signal vector $S_k$.

The IDFT units 208-1 to 208-$N_R$ perform an IDFT operation on the channel-equalized Rx signal vector $R'_k$ for each subcarrier and thus output an Rx signal vector of the time domain. For example, with respect to $N_{IDFT}$ subcarriers, if an $N_{IDFT}$-point IDFT operation is performed on the channel-equalized Rx signal vector for each Rx antenna, an Rx signal vector of an $n^{th}$ sample in the time domain is expressed by Equation (10) below.

$$r'_n = H_0 s_n + \eta_{n, \text{for } Q=1} \quad [\text{Eqn. 10}]$$

$$r'_n = H = \sum_{q=0}^{Q-1} H_q s_{n-q} + \eta_{n, \text{for } 1<Q<<N}$$

In Equation (10), $r'_n$ denotes an equalized Rx signal vector of the time domain, H denotes a constant channel in the frequency domain (i.e., the same constant channel is used in both the time domain and the frequency domain), $s_n$ denotes an $n^{th}$ sample data symbol, and $\eta_n$ denotes noise for the $n^{th}$ sample data symbol. The time-domain noise vector $\eta_n$ can be assumed to conform to a Gaussian distribution if an IDFT size (i.e., $N_{IDFT}$) is significantly large. In addition, if Q=1, the time-domain channel matrix of Equation (10) above is no longer a multi-path channel and is equivalent to the given constant MIMO channel matrix H when a channel equalization matrix of the frequency domain is determined for all $N_{IDFT}$ samples. Therefore, an ML function for all samples can be determined with a reduced complexity without having to perform additional channel estimation in the time domain.

If Q>1, a specific multi-path channel whose number of paths is reduced can be configured by allowing the value of Q to be significantly less than the value of N. Therefore, the ML function can be determined with a reduced complexity without having to perform additional channel estimation in the time domain.

The ML MIMO detector 210 performs 2-dimensional ML-based MIMO detection by using a time-domain Tx symbol vector and the same constant channel matrix with respect to a sample converted into a time-domain symbol through the IDFT. That is, by using the time-domain Tx symbol vector and the constant channel matrix H, a Euclidean distance is determined for transmittable symbols to select a symbol having a minimum distance. An ML criterion of a 2-dimensional ML receiver using the time-domain Tx symbol vector and the frequency-domain channel matrix for the ML-based MIMO reception can be expressed by Equation (11) below.

$$\hat{S}_n = \min_{S_n} \|r'_n - Hs_n\|^2, \text{ for } Q = 1 \qquad [\text{Eqn. 11}]$$

$$\hat{S}_n = \min_{S_n} \left\| r_n - \sum_{q=0}^{Q-1} H_q s_{n-q} \right\|^2, \text{ for } 1 < Q << N$$

In Equation (11), $\hat{S}_n$ denotes an estimated Tx signal vector, $r'_n$ denotes an equalized Rx signal vector of the time domain, H denotes a constant channel matrix in the frequency domain, and $s_n$ denotes a candidate symbol for an $n^{th}$ symbol.

The FEC decoder 212 receives a soft-out value for each layer from the ML MIMO detector 210 and decodes the received soft-out value. Thereafter, the FEC decoder 212 performs error correction on a decoded information bit.

The matrix selector 206 determines the constant channel matrix H and provides the determined constant channel matrix H to the MIMO equalizer 204 and the ML MIMO detector 210.

The frequency-domain channel equalizer 204 for the multiple subcarriers proposed in exemplary embodiments of the present invention can be used not only in the ML-based MIMO reception scheme but also in a linear MIMO reception scheme. Various MIMO reception schemes can be applied in the time domain according to a manner of selecting the frequency-domain constant channel matrix H given in Equation (5) above. A scheme of selecting the constant channel matrix H supporting both linear and non-linear MIMO reception schemes can be expressed by Equation (12) below.

$$H = \begin{cases} F & \text{for MIMO Rx in time-domain} \\ \hat{H}_k & \text{for MIMO Rx in frequency-domain,} \\ & k = 0, 1, \ldots, N_{IDFT} - 1 \\ (\hat{H}_k)^T & \text{for linear MIMO Rx} \end{cases} \qquad [\text{Eqn. 12}]$$

In Equation (12), F denotes an arbitrary matrix having a full rank corresponding to the number of Tx antennas (i.e., $N_T$) in the time domain under the assumption that an estimated channel matrix itself has a full rank (i.e., columns of a matrix have orthogonality and thus do not interfere with one another). According to exemplary embodiments, the channel matrix F may be selected to be an estimated channel matrix $\hat{H}_c$ (where $0 \leq c \leq N_{IDFT} - 1$) of a specific subcarrier allocated with a resource, or may be selected to be a matrix $\tilde{h}_0$ corresponding to a channel matrix of a valid frequency domain corresponding to a first path in a time-domain multi-path channel, as expressed by Equation (13) below.

$$F = \tilde{h}_0 \qquad [\text{Eqn. 13}]$$

$$= \frac{1}{N_{IDFT}} \sum_{k=0}^{N_{IDFT}-1} \hat{H}_k \exp\left(j\frac{2\pi \cdot 0 \cdot k}{N_{IDFT}}\right)$$

$$= \frac{1}{N_{IDFT}} \sum_{k=0}^{N_{IDFT}-1} \hat{H}_k, k = 0, 1, \ldots, N_{IDFT} - 1$$

In Equation (13), $\tilde{h}_0$ denotes a time-domain channel matrix for a first sample, $N_{IDFT}$ denotes an IDFT size, and $\hat{H}_k$ denotes an estimated channel matrix.

In the frequency domain, H can be selected to be $\hat{H}_k$. In case of the linear MIMO reception, H can be selected to be $(\hat{H}_k)^H$.

When a quasi-optimal ML receiver (i.e., QR-decomposition and M-algorithm (QRD-M), Quality Of Control (QOC), etc.) using QR decomposition is used among ML-based MIMO receivers, the aforementioned selected channel matrix H can be QR-decomposed. Then, R and F (where F=QR) corresponding to an inverse triangular matrix can be re-selected as the constant channel matrix.

In the conventional linear MIMO reception scheme (see FIG. 1A), the constant channel matrix H of Equation (12) above is set to $H = (\hat{H}_k)^T$, and channel equalization is performed in the frequency domain for each subcarrier by setting the inverse matrix of Equation (7) to an inverse matrix based on ZF or MMSE. Therefore, the frequency-domain channel equalizer 204 according to exemplary embodiments of the present invention can be applied not only to the ML-based MIMO receiver not also the linear MIMO receiver.

Figure 3:
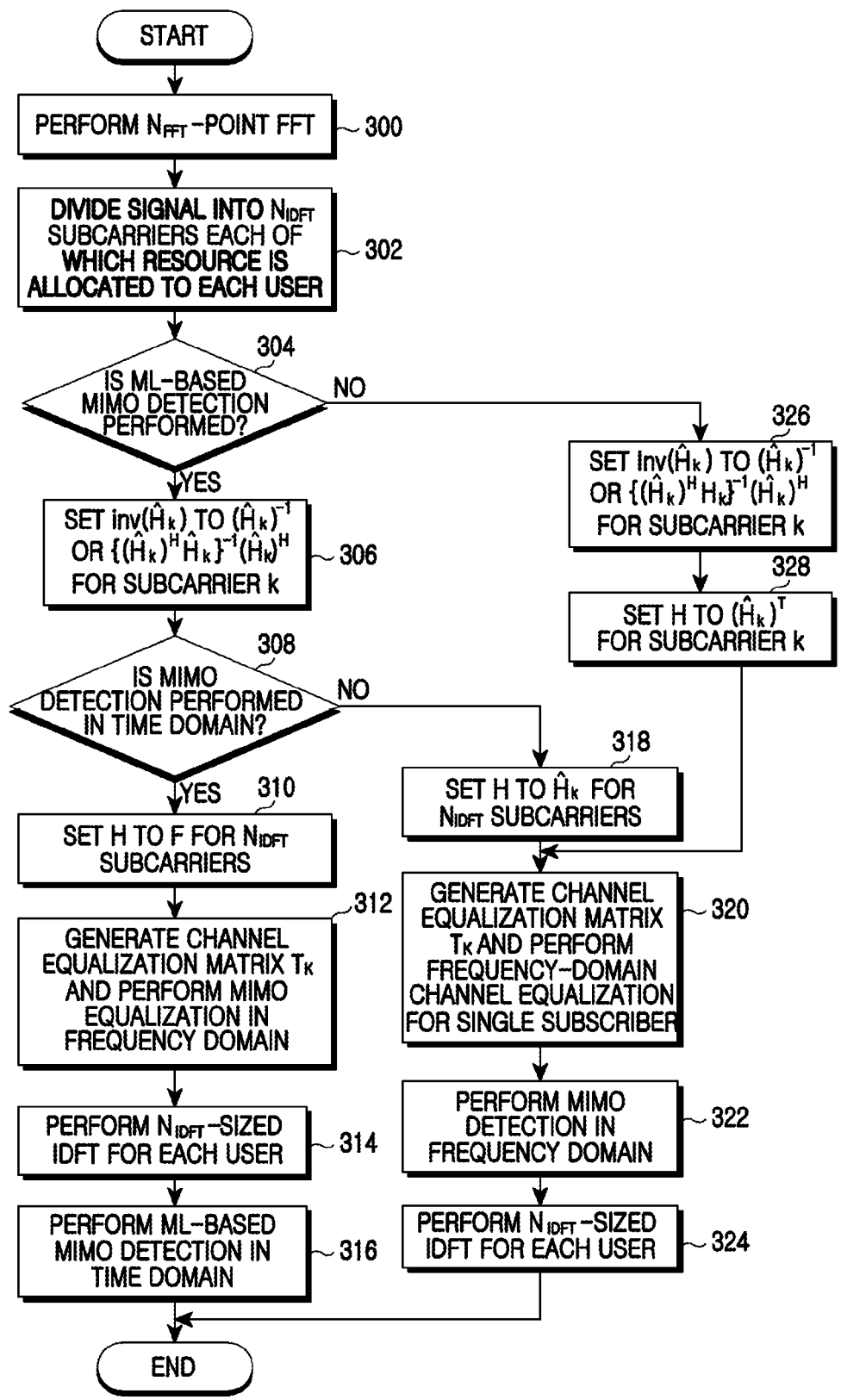
FIG. 3 is a flowchart illustrating a receiving operation in an SC-FDMA system according to an exemplary embodiment of the present invention.

FIG. 3 is a flowchart illustrating a receiving operation in an SC-FDMA system according to an exemplary embodiment of the present invention.

Referring to FIG. 3, in step 300, a receiver converts an RF signal received through at least one Rx antenna into a baseband signal and performs an FFT operation.

In step 302, the receiver divides a frequency-domain signal which has undergone the FFT operation into subcarriers having an IDFT size (i.e., $N_{IDFT}$).

In step 304, the receiver determines whether to perform ML-based MIMO detection. If the ML-based MIMO detection is performed, proceeding to step 306, the receiver configures the inverse matrix Inv($\hat{H}_k$) to obtain the channel equalization matrix $T_k$ for each subcarrier (see Equation (6) above). For example, if the number of Tx antennas is equal to the number of Rx antennas and if $H = (\hat{H}_k)^T$ in an ML-based receiver, then Inv($\hat{H}_k$) is $(\hat{H}_k)^{-1}$. When the ML-based receiver uses a Moore-Penrose inverse matrix, Inv($\hat{H}_k$) is $\{(\hat{H}_k)^H \hat{H}_k\}^{-1} (\hat{H}_k)^H$.

In step 308, the receiver determines whether MIMO detection is performed in a time domain. If MIMO detection is performed in the time domain, proceeding to step 310, the receiver configures the constant channel matrix H for $N_{IDFT}$ subcarriers (see Equation (11) above). For example, H is set to F in the time domain. In step 312, the receiver generates the channel equalization matrix $T_k$ by using the constant channel matrix H, and performs channel equalization in a frequency domain. That is, the receiver multiplies the channel equalization matrix $T_k$ by each of the received signal vector and the estimated channel matrix in the frequency domain (see Equation (5) and Equation (8) above). In step 314, the receiver performs an IDFT operation on a frequency-domain Rx signal vector equalized for each Rx antenna. In step 316, the receiver performs ML-based MIMO detection in the time domain.

In contrast, if MIMO detection is performed not in the time domain but in the frequency domain in step 308, proceeding to step 318, the receiver sets the constant channel matrix H to $\hat{H}_k$ with respect to $N_{IDFT}$ subcarriers. In step 320, the receiver performs frequency-domain channel equalization for a single subcarrier. In step 322, the receiver performs MIMO detection in the frequency domain. In step 324, the receiver performs an $N_{IDFT}$-point IDFT operation.

If ML-based MIMO detection (i.e., linear MIMO detection) is not performed in step 304, proceeding to step 326, the receiver sets the inverse matrix $\text{Inv}(\hat{H}_k)$ to $\{\hat{H}_k(\hat{H}_k)^H\}^{-1}$ or $\{\hat{H}_k(\hat{H}_k)^H + \sigma_n^2 I_{N_R}\}^{-1}$ for each subcarrier. For example, if $H=(\hat{H}_k)^T$ in a ZF-based receiver, then $\text{Inv}(\hat{H}_k)$ is $\{\hat{H}_k(\hat{H}_k)^H\}^{-1}$. When $H=(\hat{H}_k)^T$ in an MMSE-based receiver, then $\text{Inv}(\hat{H}_k)$ is $\{\hat{H}_k(\hat{H}_k)^H + \sigma_n^2 I_{N_R}\}^{-1}$. In step 328, the receiver sets H to $(\hat{H}_k)^T$ for each subcarrier, and then steps 320 to 324 are performed.

Thereafter, the procedure of FIG. 3 ends.

Figure 4A:
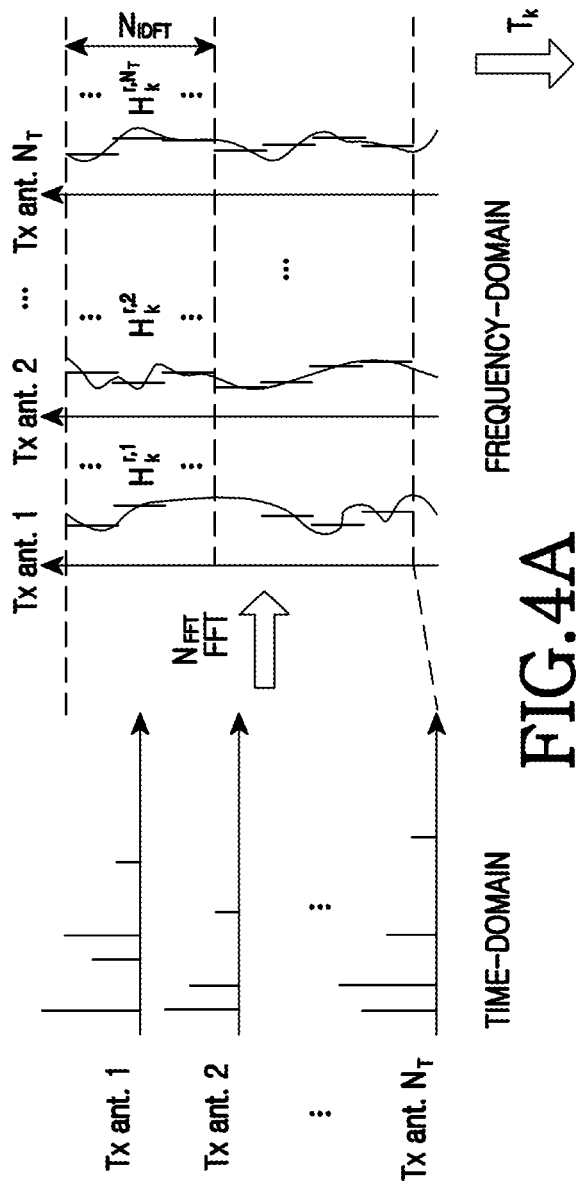
FIGS. 4A and 4B are examples of channel equalization for converting a multi-path channel into a single path channel.
Figure 4B:
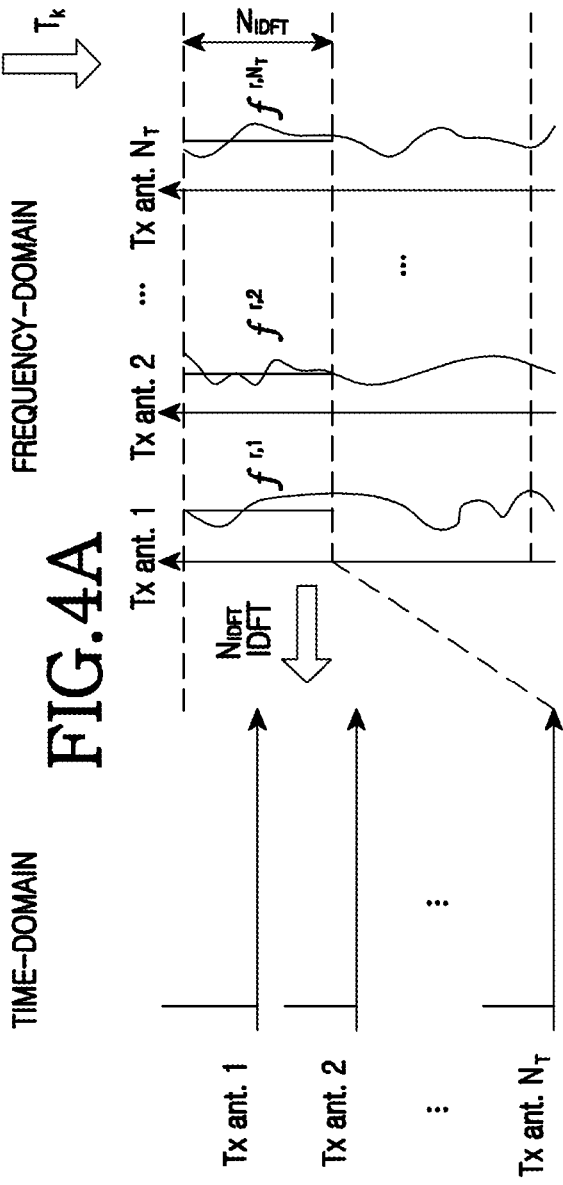

FIGS. 4A and 4B are examples of channel equalization for converting a multi-path channel into a single path channel. As described above, if the multi-path channel can be converted to be similar to a single path channel in the time domain by removing frequency selectivity, the ML-based MIMO receiver can operate in the time domain in substantially the same manner as in the single path channel. In this case, the frequency selectivity can be removed by properly converting a channel matrix in the frequency domain as illustrated in FIGS. 4A and 4B.

According to exemplary embodiments of the present invention, a multi-path channel of an SC-FDMA system is converted into a single path channel, and then channel compensation is performed in a frequency domain and a received symbol is processed in a time domain. Therefore, ML detection can be achieved with a decreased complexity and with an excellent throughput. In addition, since a constant channel matrix of the frequency domain is differently operated in a channel equalizer for multiple subcarriers, there is an advantage in that linear MIMO reception and ML-based MIMO reception can both be supported in the SC-FDMA system.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus in a Single Carrier Frequency Division Multiple Access (SC-FDMA) system, the apparatus comprising:
   a matrix selector for selecting a constant channel matrix according to a Multiple-Input Multiple-Output (MIMO) reception scheme;
   a channel equalizer for equalizing a multi-path channel to a prescribed path channel in a frequency domain by using the constant channel matrix; and
   a MIMO detector for determining a Euclidean distance of transmittable symbols from a time-domain Transmit (Tx) signal using the channel equalized in the frequency domain and for selecting a symbol having a minimum Euclidean distance,
   wherein the channel equalizer performs channel equalization by multiplying the constant channel matrix by an inverse matrix of a channel estimation matrix.

2. The apparatus of claim 1, wherein, if the number of Tx antennas is equal to the number of Receive (Rx) antennas in a Maximum Likelihood (ML)-based receiver, then $\text{Inv}(\hat{H}_k)$ is $(\hat{H}_k)^{-1}$, where $\hat{H}_k$ denotes an estimated channel matrix of a $k^{th}$ subcarrier, and $\text{Inv}(\bullet)$ or $(\bullet)^{-1}$ denotes an inverse matrix operation.

3. The apparatus of claim 1, wherein, if an ML-based receiver uses a Moore-Penrose inverse matrix, then $\text{Inv}(\hat{H}_k)$ is $\{(\hat{H}_k)^H \hat{H}_k\}^{-1} (\hat{H}_k)^H$, where $\hat{H}_k$ denotes an estimated channel matrix of a $k^{th}$ subcarrier, $\text{Inv}(\bullet)$ or $(\bullet)^{-1}$ denotes an inverse matrix operation, and $(\bullet)^H$ denotes a Hermitian transpose matrix.

4. The apparatus of claim 1, wherein, if $H=(\hat{H}_k)^T$ in a Zero Forcing (ZF)-based receiver, then $\text{Inv}(\hat{H}_k)$ is $\{\hat{H}_k(\hat{H}_k)^H\}^{-1}$, where $\hat{H}_k$ denotes an estimated channel matrix of a $k^{th}$ subcarrier, $\text{Inv}(\bullet)$ or $(\bullet)^{-1}$ denotes an inverse matrix operation, $(\bullet)^H$ denotes a Hermitian transpose matrix, and $(\bullet)^T$ denotes a transpose matrix.

5. The apparatus of claim 1, wherein, if $H=(\hat{H}_k)^T$ in a Minimum Mean Squared Error (MMSE)-based receiver, then $\text{Inv}(\hat{H}_k)$ is $\{\hat{H}_k(\hat{H}_k)^H + \sigma_n^2 I_{N_R}\}^{-1}$, where $\hat{H}_k$ denotes an estimated channel matrix of a $k^{th}$ subcarrier, $\text{Inv}(\bullet)$ or $(\bullet)^{-1}$ denotes an inverse matrix operation, $(\bullet)^H$ denotes a Hermitian transpose matrix, $(\bullet)^T$ denotes a transpose matrix, $\sigma_n^2$ denotes a noise distribution, $I_{N_R}$ denotes a unit matrix, and $N_R$ denotes the number of Rx antennas.

6. The apparatus of claim 1, further comprising a channel estimator for estimating a channel in the frequency domain.

7. The apparatus of claim 1, wherein, when Maximum Likelihood (ML)-based MIMO detection is considered in the time domain, the matrix selector selects one of an arbitrary matrix having a full rank corresponding to the number of Tx antennas, an estimated channel matrix of a prescribed subcarrier, and a channel matrix of a valid frequency domain corresponding to an arbitrary path of a multi-path channel in the time domain.

8. The apparatus of claim 1, wherein, when Maximum Likelihood (ML)-based MIMO detection is considered in the frequency domain, the matrix selector selects an estimated channel matrix $\hat{H}_k$ as the channel matrix.

9. The apparatus of claim 1, wherein, when linear MIMO reception is achieved, the matrix selector selects $(\hat{H}_k)^T$ as the constant channel matrix, where $\hat{H}_k$ denotes an estimated channel matrix of a $k^{th}$ subcarrier and $(\bullet)^T$ denotes a transpose operation.

10. A method in a Single Carrier Frequency Division Multiple Access (SC-FDMA) system, the method comprising:
    selecting a constant channel matrix according to a Multiple-Input Multiple-Output (MIMO) reception scheme;
    equalizing a multi-path channel to a prescribed path channel in a frequency domain using the constant channel matrix;
    determining a Euclidean distance of transmittable symbols from a time-domain Transmit (Tx) signal using the channel equalized in the frequency domain; and
    selecting a symbol having a minimum Euclidean distance,
    wherein the equalizing of the multi-path channel comprises multiplying the constant channel matrix by an inverse matrix of a channel estimation matrix.

11. The method of claim 10, wherein, if the number of Tx antennas is equal to the number of Receive (Rx) antennas in a Maximum Likelihood (ML)-based receiver, then $\text{Inv}(\hat{H}_k)$ is $(\hat{H}_k)^{-1}$, where $\hat{H}_k$ denotes an estimated channel matrix of a $k^{th}$ subcarrier, and $\text{Inv}(\bullet)$ or $(\bullet)^{-1}$ denotes an inverse matrix operation.

12. The method of claim 10, wherein, if a Maximum Likelihood (ML)-based receiver uses a Moore-Penrose inverse matrix, then $\text{Inv}(\hat{H}_k)$ is $\{(\hat{H}_k)^H \hat{H}_k\}^{-1}(\hat{H}_k)^H$, where $\hat{H}_k$ denotes an estimated channel matrix of a $k^{th}$ subcarrier, $\text{Inv}(\bullet)$ or $(\bullet)^{-1}$ denotes an inverse matrix operation, and $(\bullet)^H$ denotes a Hermitian transpose matrix.

13. The method of claim 10, wherein, if $H=(\hat{H}_k)^T$ in a Zero Forcing (ZF)-based receiver, then $\text{Inv}(\hat{H}_k)$ is $\{\hat{H}_k(\hat{H}_k)^H\}^{-1}$, where $\hat{H}_k$ denotes an estimated channel matrix of a $k^{th}$ subcarrier, $\text{Inv}(\bullet)$ or $(\bullet)^{-1}$ denotes an inverse matrix operation, $(\bullet)^H$ denotes a Hermitian transpose matrix, and $(\bullet)^T$ denotes a transpose matrix.

14. The method of claim 10, wherein, if $H=(\hat{H}_k)^T$ in a Minimum Mean Squared Error (MMSE)-based receiver, then $\text{Inv}(\hat{H}_k)$ is $\{\hat{H}_k(\hat{H}_k)^H+\sigma_n^2 I_{N_R}\}^{-1}$, where $\hat{H}_k$ denotes an estimated channel matrix of a $k^{th}$ subcarrier, $\text{Inv}(\bullet)$ or $(\bullet)^{-1}$ denotes an inverse matrix operation, $(\bullet)^H$ denotes a Hermitian transpose matrix, $(\bullet)^T$ denotes a transpose matrix, $\sigma_n^2$ denotes a noise distribution, $I_{N_R}$ denotes a unit matrix, and $N_R$ denotes the number of Rx antennas.

15. The method of claim 10, further comprising estimating a channel in the frequency domain.

16. The method of claim 10, wherein the selecting of the constant channel matrix comprises, when Maximum Likelihood (ML)-based MIMO detection is considered in the time domain, selecting one matrix from an arbitrary matrix having a full rank corresponding to the number of Tx antennas, an estimated channel matrix of a prescribed subcarrier, and a channel matrix of a valid frequency domain corresponding to an arbitrary path of a multi-path channel in the time domain.

17. The method of claim 10, wherein the selecting of the constant channel matrix comprises, when Maximum Likelihood (ML)-based MIMO detection is considered in the frequency domain, selecting an estimated channel matrix $\hat{H}_k$ as the channel matrix.

18. The method of claim 10, wherein the selecting of the constant channel matrix comprises, when linear MIMO reception is achieved, selecting $(\hat{H}_k)^T$ as the constant channel matrix, where $\hat{H}_k$ denotes an estimated channel matrix of a $k^{th}$ subcarrier and $(\bullet)^T$ denotes a transpose operation.

* * * * *